US012224105B2

(12) United States Patent
Asai et al.

(10) Patent No.: US 12,224,105 B2
(45) Date of Patent: Feb. 11, 2025

(54) COIL COMPONENT

(71) Applicant: TDK Corporation, Tokyo (JP)

(72) Inventors: Yugo Asai, Tokyo (JP); Aoi Tokiwa, Tokyo (JP); Daisuke Urabe, Tokyo (JP)

(73) Assignee: TDK Corporation, Tokyo (JP)

( * ) Notice: Subject to any disclaimer, the term of this patent is extended or adjusted under 35 U.S.C. 154(b) by 876 days.

(21) Appl. No.: 17/189,887

(22) Filed: Mar. 2, 2021

(65) Prior Publication Data

US 2021/0280358 A1 Sep. 9, 2021

(30) Foreign Application Priority Data

Mar. 3, 2020 (JP) ................................ 2020-035713

(51) Int. Cl.

*H01F 17/04* (2006.01)
*H01F 27/26* (2006.01)
*H01F 27/28* (2006.01)
*H01F 27/29* (2006.01)
*H01F 41/02* (2006.01)
*H01F 41/064* (2016.01)

(52) U.S. Cl.

CPC ......... *H01F 27/2823* (2013.01); *H01F 27/26* (2013.01); *H01F 27/29* (2013.01); *H01F 41/0206* (2013.01); *H01F 41/064* (2016.01)

(58) Field of Classification Search

CPC .................................................. H01F 27/2823
USPC .......................................................... 336/221
See application file for complete search history.

(56) References Cited

U.S. PATENT DOCUMENTS

| | | | | |
|---|---|---|---|---|
| 6,157,283 | A | 12/2000 | Tsunemi | |
| 6,373,366 | B1 | 4/2002 | Sato et al. | |
| 2018/0211756 | A1* | 7/2018 | Kuo | H01F 27/29 |
| 2018/0261379 | A1 | 9/2018 | Igarashi | |
| 2019/0172630 | A1 | 6/2019 | Asai et al. | |
| 2019/0318865 | A1 | 10/2019 | Mikogami et al. | |

FOREIGN PATENT DOCUMENTS

| | | | |
|---|---|---|---|
| CN | 107453042 | A | 12/2017 |
| JP | 2003-077730 | A | 3/2003 |
| JP | 2009-206352 | A | 9/2009 |
| JP | 2011-119379 | A | 6/2011 |
| JP | 2018-148081 | A | 9/2018 |

OTHER PUBLICATIONS

English translation of JP2004146662 (Year: 2004).*
English translation of JP2012029210 (Year: 2012).*

* cited by examiner

*Primary Examiner* — Ronald Hinson
(74) *Attorney, Agent, or Firm* — Rimon P.C.

(57) ABSTRACT

Disclosed herein is a coil component that includes: a drum-shaped core including a first flange part, a second flange part, and a winding core part positioned between the first and second flange parts; a plurality of first terminal electrodes provided on the first flange part; a plurality of second terminal electrodes provided on the second flange part; and a plurality of wires wound around the winding core part, each of the plurality of wires having a first end connected to an associated one of the first terminal electrodes, and having a second end connected to an associated one of the second terminal electrodes. Each of the first and second flange parts has a tapered groove whose side surfaces are inclined. The plurality of wires are accommodated in the tapered grooves.

11 Claims, 7 Drawing Sheets

COIL COMPONENT

BACKGROUND OF THE INVENTION

Field of the Invention

The present invention relates to a coil component and, more particularly, to a coil component using a drum-shaped core.

Description of Related Art

As a coil component using a drum-shaped core, a coil component described in JP 2018-148081A is known. The coil component described in JP 2018-148081A has two wires wound around a winding core part of a drum-shaped core thereof, and one end of each of the two wires is connected to a terminal electrode provided on one flange part, and the other end thereof is connected to a terminal electrode provided on the other flange part.

In the coil component described in JP 2018-148081A, the vicinities of the end portions of the two wires are significantly separated, so that, when this coil component is used as a common mode choke coil, a large variation disadvantageously occurs in characteristics such as an S parameter. To solve such a disadvantage, there can be conceived a method of forming a groove in the flange part and accommodating a wire in the formed groove; however, depending on the shape or size of the groove, it may be difficult to accommodate the wires in the groove during the manufacture of the coil component and to sufficiently reduce variation in characteristics such as an S parameter.

SUMMARY

It is therefore an object of the present invention to provide a coil component having a configuration in which a plurality of wires are wound around a drum-shaped core, capable of improving working efficiency during the manufacture of the coil component and sufficiently reducing variation in characteristics such as an S parameter.

A coil component according to the present invention includes: a drum-shaped core including a first flange part, a second flange part, and a winding core part positioned between the first and second flange parts; a plurality of terminal electrodes provided on the first flange part; a plurality of terminal electrodes provided on the second flange part; and a plurality of wires wound around the winding core part, having one end connected to one of the plurality of terminal electrodes provided on the first flange part, and having the other end connected to one of the plurality of terminal electrodes provided on the second flange part. The first and second flange parts each have a tapered groove whose side surfaces are inclined so as to be close to each other, and the plurality of wires are accommodated in the tapered grooves.

According to the present invention, the wires are easily accommodated in the grooves during the manufacture of the coil component, improving working efficiency. In addition, the tapered shape of each groove enhances the positioning effect of the wires in the groove, making it possible to reduce a variation in characteristics such as an S parameter due to shift of the wires.

In the present invention, the space factor of the plurality of wires in each groove may be 60% or more. This can suppress reduction in the volume of the drum-shaped core due to the presence of the grooves, making it possible to obtain high magnetic characteristics.

In the present invention, the plurality of wires may include first and second wires, the grooves may include a first groove for accommodating the first wire and a second groove for accommodating the second wire, and the first and second grooves may extend in parallel to each other. This prevents the plurality of wires from interfering with each other in each groove.

The coil component according to the present invention may further have a plate-like core fixed to the first and second flange parts. The grooves may be formed in the surfaces of the first and second flange parts that face the plate-like core, and the plate-like core may have a groove at a position overlapping the grooves of the first and second flange parts. Thus, even when the cross-sectional size of each of the grooves formed in the first and second flange parts is designed small, interference between the wires and the plate-like core can be prevented.

As described above, according to the present invention, there can be provided a coil component having a configuration in which a plurality of wires are wound around a drum-shaped core, capable of improving working efficiency during the manufacture of the coil component and sufficiently reducing variation in characteristics such as an S parameter.

BRIEF DESCRIPTION OF THE DRAWINGS

The above features and advantages of the present invention will be more apparent from the following description of certain preferred embodiments taken in conjunction with the accompanying drawings, in which.

DETAILED DESCRIPTION OF THE EMBODIMENTS

Preferred embodiments of the present invention will be explained below in detail with reference to the accompanying drawings.

First Embodiment

Figure 1:
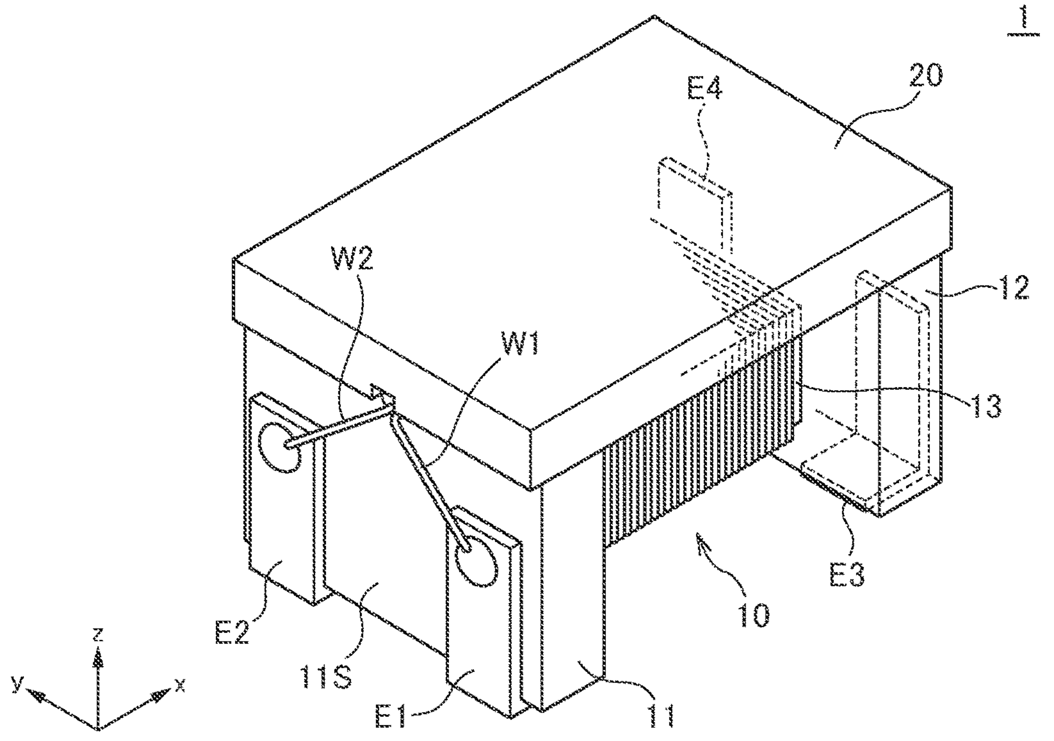
FIGS. 1 and 2 are schematic perspective views illustrating the outer appearance of a coil component 1 according to a first embodiment of the present invention.
Figure 2:
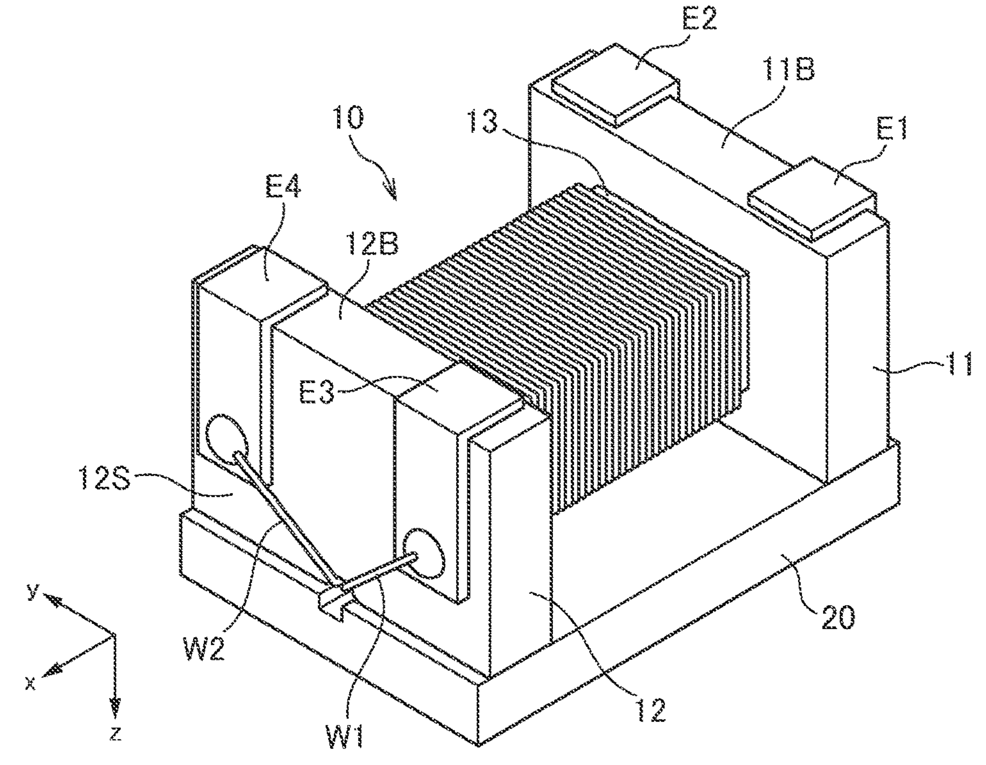

FIGS. 1 and 2 are schematic perspective views illustrating the outer appearance of a coil component 1 according to a first embodiment of the present invention.

The coil component 1 according to the present embodiment is a common mode choke coil and includes, as illustrated in FIGS. 1 and 2, a drum-shaped core 10, a plate-like core 20, terminal electrodes E1 to E4, and wires W1 and W2. As a material for the drum-shaped core 10 and plate-like core 20, a magnetic material having a high permeability such as ferrite is used. The same magnetic material or different magnetic materials may be used for the drum-shaped core 10 and the plate-like core 20, and the magnetic material preferably has a permeability μ of 10 to 4000 H/m.

Figure 3:
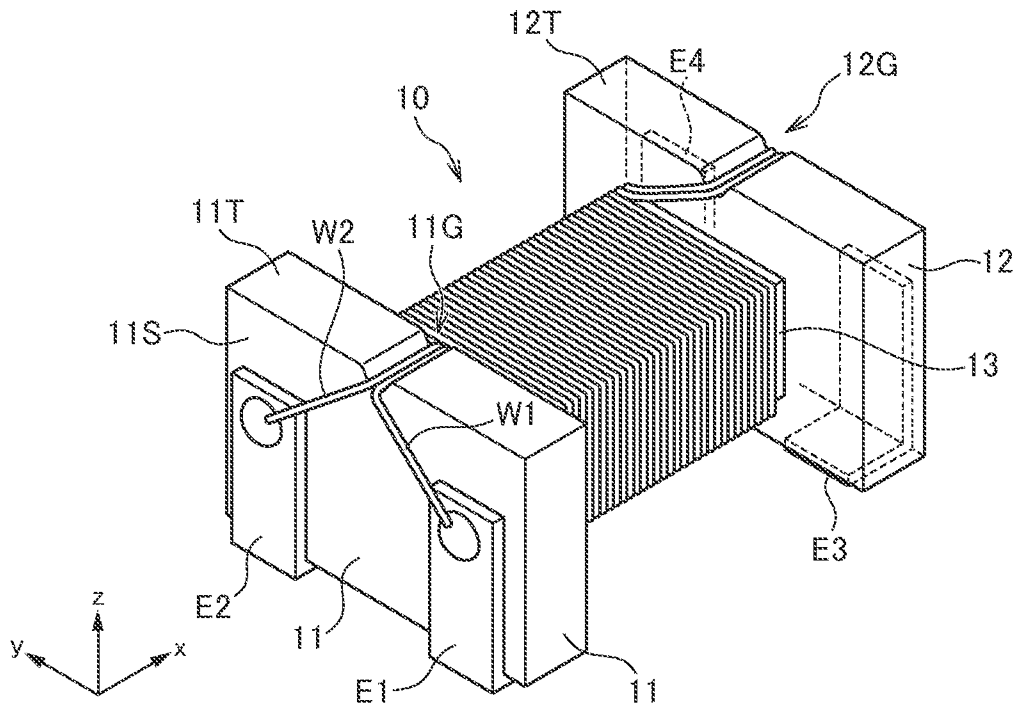
FIG. 3 is a schematic perspective view illustrating a state where the plate-like core 20 is removed from the coil component 1.

FIG. 3 is a schematic perspective view illustrating a state where the plate-like core 20 is removed from the coil component 1.

As illustrated in FIGS. 1 to 3, the drum-shaped core 10 includes a winding core part 13 with its axis directed in the x-direction, a flange part 11 provided on one end of the winding core part 13 in the x-direction, and a flange part 12 provided on the other end of the winding core part 13 in the x-direction. The terminal electrodes E1 and E2 are provided on the flange part 11 and arranged in the y-direction in this order. The terminal electrodes E3 and E4 are provided on the flange part 12 and arranged in the y-direction in this order. The terminal electrodes E1 to E4 are each, for example, a terminal fitting. The wires W1 and W2 are wound around the winding core part 13. One ends of the wires W1 and W2 are connected to the terminal electrodes E1 and E2, respectively, and the other ends thereof are connected to the terminal electrodes E3 and E4, respectively. The number of turns of the wires W1 and W2 and the winding direction thereof are the same as each other. The wires W1 and W2 are the same in the number of turns and winding direction.

The flange parts 11 and 12 of the drum-shaped core 10 have outer surfaces 11S and 12S constituting the yz plane, bottom surfaces 11B and 12B constituting the xy plane and facing a circuit board upon actual use, and top surfaces 11T and 12T constituting the xy plane and facing the plate-like core 20. The terminal electrodes E1 and E2 each have an L-shape formed over the outer surface 11S and bottom surface 11B of the flange part 11, and the terminal electrodes E3 and E4 each have an L-shape formed over the outer surface 12S and bottom surface 12B of the flange part 12. The one ends of the wires W1 and W2 are connected respectively to parts of the terminal electrodes E1 and E2 that cover the outer surface 11S, and the other ends of the wires W1 and W2 are connected respectively to parts of the terminal electrodes E3 and E4 that cover the outer surface 12S. The connection of each of the wires W1 and W2 can be done through, e.g. welding.

As illustrated in FIG. 3, a groove 11G is formed in the top surface 11T of the flange part 11 so as to extend in the x-direction, and a groove 12G is formed in the upper surface 12T of the flange part 12 so as to extend in the x-direction. Leading portions of the wires W1 and W2 positioned between the winding core part 13 and the terminal electrodes E1, E2 are accommodated in the groove 11G, and leading portions of the wires W1 and W2 positioned between the winding core part 13 and the terminal electrodes E3, E4 are accommodated in the groove G12. This allows the wires W1 and W2 to extend along each other not only at parts thereof that are wound around the winding core part 13 but also the leading portions, thereby reducing a variation in characteristics such as an S parameter.

Figure 4:
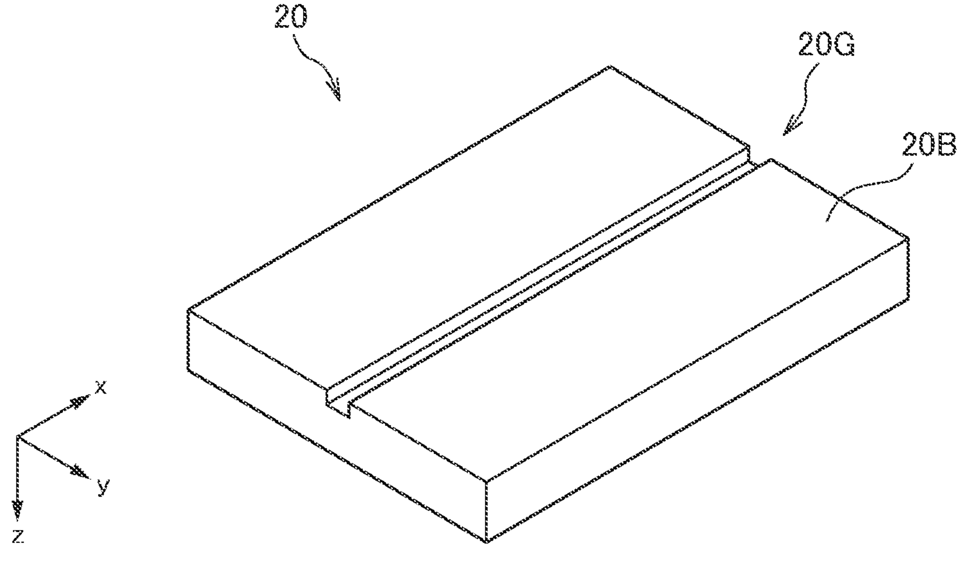
FIG. 4 is a schematic perspective view illustrating the outer appearance of the plate-like core 20.

FIG. 4 is a schematic perspective view illustrating the outer appearance of the plate-like core 20.

As illustrated in FIG. 4, a groove 20G is formed in a surface 20B of the plate-like core 20 so as to extend in the x-direction. The surface 20B of the plate-like core 20 faces the top surfaces 11T and 12T of the flange parts 11 and 12, and the groove 20G overlaps the grooves 11G and 12G. Although the groove 20G is formed over the entire length of the plate-like core 20 in the x-direction in the example of FIG. 4, the groove 20G may be omitted at substantially the center portion in the x-direction. In this case, the volume of the plate-like core 20 increases, leading to an improvement in magnetic characteristics. However, in view of ease of the manufacture of the plate-like core 20, the groove 20G is preferably formed over the entire length of the plate-like core 20 in the x-direction as illustrated in FIG. 4.

Figure 5:
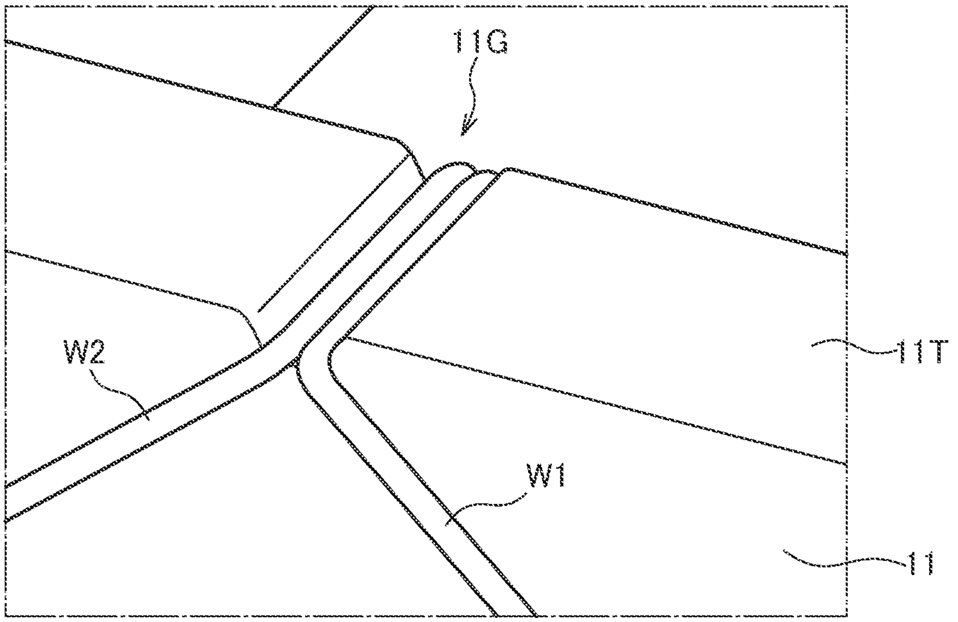
FIG. 5 is a schematic perspective view illustrating the groove 11G in an enlarged manner.
Figure 6:
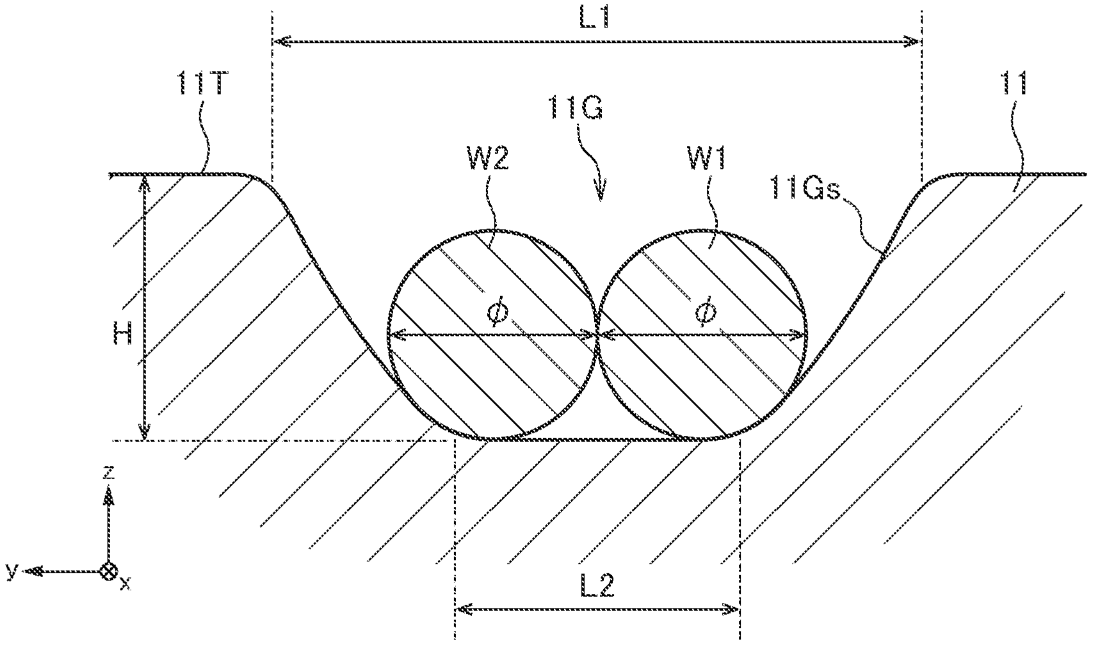
FIG. 6 is a schematic cross-sectional view for explaining the position of the wires W1 and W2 in the groove 11G.

FIG. 5 is a schematic perspective view illustrating the groove 11G in an enlarged manner, and FIG. 6 is a schematic cross-sectional view for explaining the position of the wires W1 and W2 in the groove 11G.

As illustrated in FIG. 5, the two wires W1 and W2 extending in the x-direction are accommodated in parallel in the groove 11G. The shape and size of the groove 11G are designed so as to position the wires W1 and W2 in parallel to each other in the groove 11G as illustrated in FIG. 6. Specifically, side surfaces 11Gs of the groove 11G are inclined so as to be close to each other to taper the groove 11G in the depth direction, and a width L1 of the opening of the groove 11G in the y-direction is designed to be sufficiently larger than twice the diameter ϕ of each of the wires W1 and W2. A depth H of the groove 11G is designed larger than the diameter ϕ. When the depth H of the groove 11G is excessively large, the volume of the drum-shaped core 10 decreases accordingly, so that the depth H of the groove 11G is preferably 1.5 times or more and 3 times or less the diameter ϕ.

Since the width L1 of the opening of the groove 11G in the y-direction is designed to be sufficiently larger than twice the diameter ϕ of each of the wires W1 and W2, the wires W1 and W2 are easily accommodated in the groove 11G during the manufacture of the coil component 1, improving working efficiency. Specifically, the width L1 of the opening of the groove 11G is preferably designed to be four times or more and six time or less the diameter ϕ. When the width L1 is less than three times the diameter ϕ, working efficiency is not improved sufficiently, and when the width L1 is larger than four times the diameter ϕ, the volume of the drum-shaped core 10 significantly decreases. Further, in the present embodiment, the tapered shape of the groove 11G makes a force directed toward the center of the groove 11G act on the wires W1 and W2, making it possible to position the wires W1 and W2 at the center of the groove 11G. To enhance the positioning effect of the wires W1 and W2, a width L2 of the bottom portion of the groove 11G in the y-direction is preferably designed to be less than twice the diameter ϕ of each of the wires W1 and W2. This brings the wires W1 and W2 into contact with the inclined surfaces 11Gs, so that the force directed toward the center of the groove 11G always acts on the wires W1 and W2.

The space factor of the wires W1 and W2 in the groove 11G is preferably 60% or more. In other words, it is preferable that the cross section of the groove 11G is designed sufficiently small such that the residual space in the groove 11G is less than 40%. This can suppress reduction in the volume of the drum-shaped core 10 due to the presence of the groove 11G, making it possible to obtain high magnetic characteristics.

Figure 7:
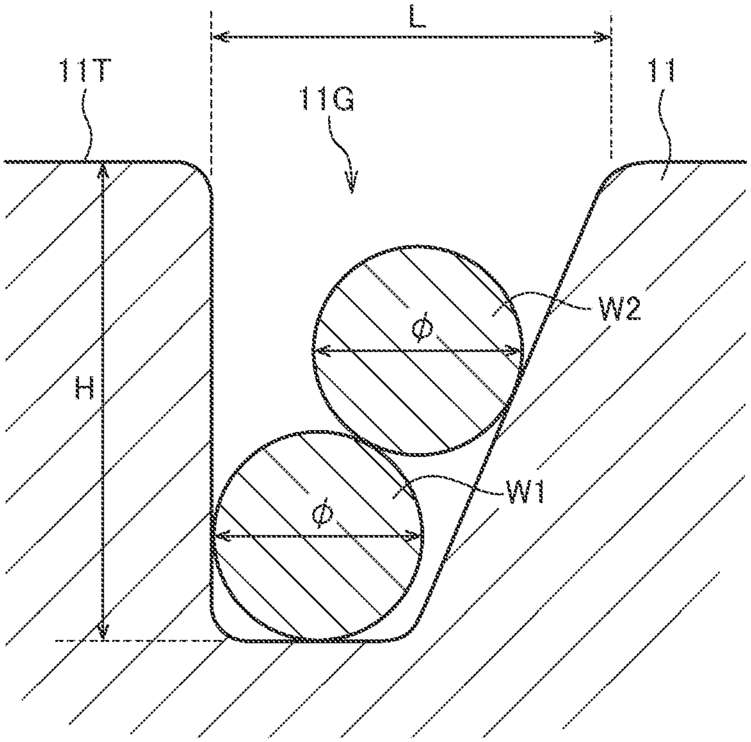
FIG. 7 is a schematic cross-sectional view for indicating the groove 11G according to a first modification.

Further, as in a first modification illustrated in FIG. 7, a configuration may be possible in which one of the side surfaces 11Gs of the groove 11G is inclined so as to be close to the other one or each other, the depth H of the groove 11G is designed to be twice or slightly larger than the diameter ϕ of each of the wires W1 and W2, and the width L1 of the opening of the groove 11G is designed equal to or more than the diameter ϕ and less than 2ϕ. With this configuration, the wire W2 positioned on the upper side is positioned by the inclined side surface 11Gs and the wire W1, making it possible to position the wires W1 and W2 in parallel to each other.

Figure 8:
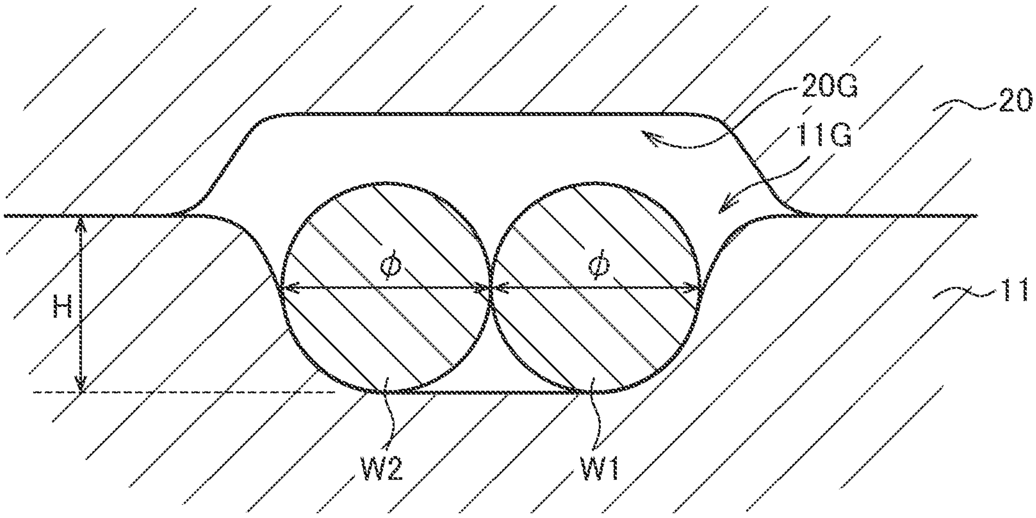
FIG. 8 is a schematic cross-sectional view for indicating the groove 11G according to a second modification.

Further, as in a second modification illustrated in FIG. 8, the depth H of the groove 11G may be designed smaller than the diameter ϕ of each of the wires W1 and W2. In this case, the wires W1 and W2 partially protrude from the groove 11G; however, the groove 20G of the plate-like core 20 is present at a position overlapping the groove 11G, so that the wires W1, W2 and plate-like core 20 do not interfere with each other. Further, the groove 11G is formed shallow, making it possible to further suppress a reduction in volume of the drum-shaped core 10. When it is clear that the wires W1 and W2 do not protrude from the groove 11G at all, the groove 20G need not be formed in the plate-like core 20 even when manufacturing variation is taken into account. Further, the side surface 11Gs of the groove 20G need not be inclined but may be formed vertically upright. This can suppress reduction in the volume of the plate-like core 20 due to the presence of the groove 20G.

The above description has been made focusing on the groove 11G. The groove 12G has the same shape and size as those of the groove 11G.

As described above, in the coil component 1 according to the present embodiment, the side surfaces of each of the grooves 11G and 12G are inclined so as to be close to each other to taper each of the grooves 11G and 12G. This facilitates accommodation of the wires W1 and W2 in the grooves 11G and 12G during the manufacture of the coil component, thereby improving working efficiency. In addition, in each of the grooves 11G and 12G, a force directed toward the center of the groove acts on the wires W1 and W2, making it possible to position the wires W1 and W2 in parallel to each other. This can reduce a variation in characteristics such as an S parameter. In addition, the grooves 11G and 12G are closed from above by the plate-like core 20, thereby preventing coming-off of the wires W1 and W2. Further, the grooves 11G and 12G are formed in substantially the centers of the flange parts 11 and 12 in the y-direction, so that the lengths of the wires W1 and W2 between the terminal electrodes E1, E2 (or E3, E4) and the winding core part 13 can be made substantially coincide with each other.

Second Embodiment

Figure 9:
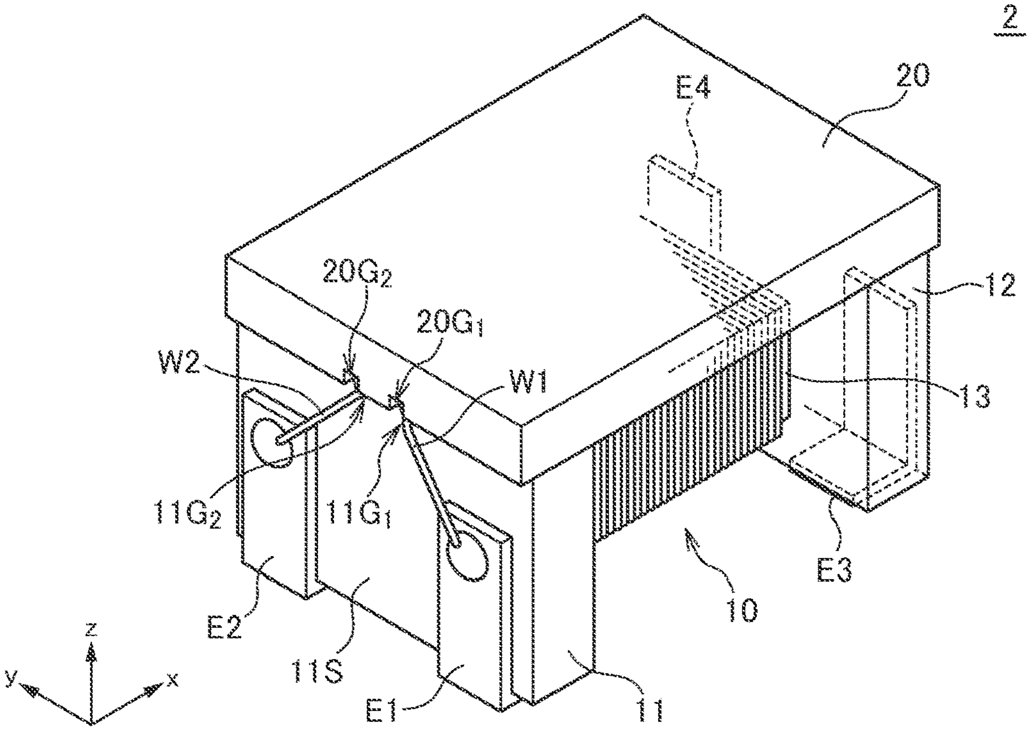
FIG. 9 is a schematic perspective view illustrating the outer appearance of a coil component 2 according to a second embodiment of the present invention.
Figure 10:
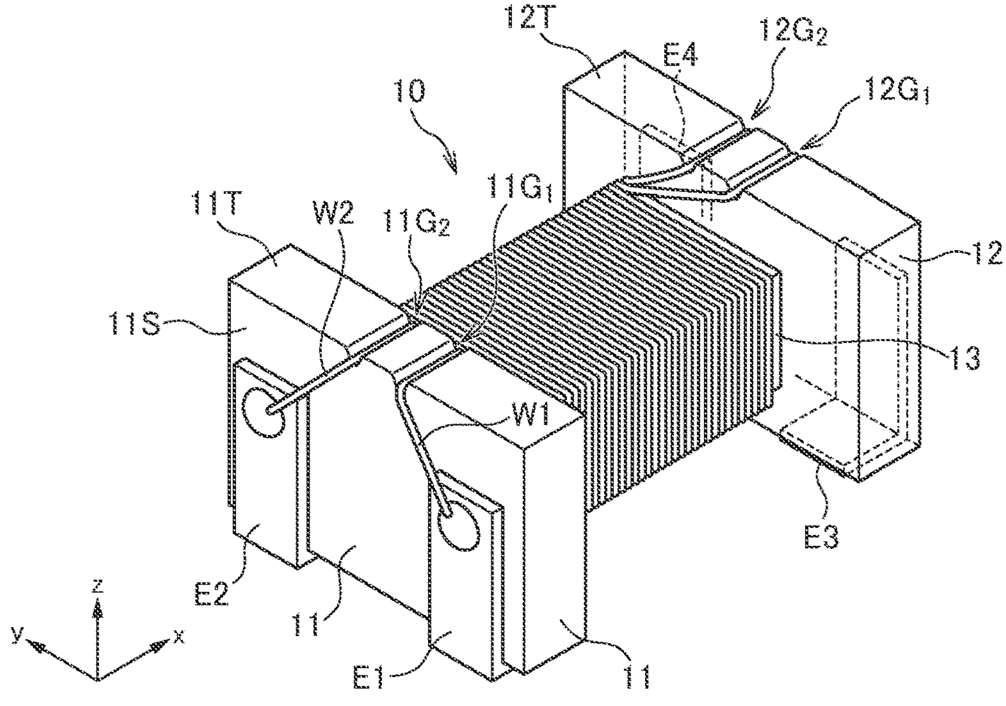
FIG. 10 is a schematic perspective view illustrating a state where the plate-like core 20 is removed from the coil component 2.
Figure 11:
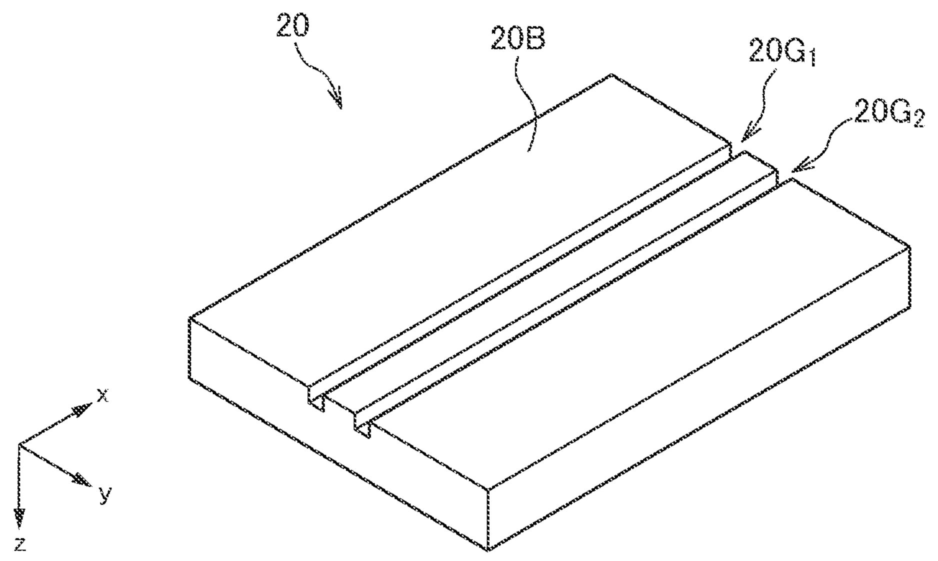
FIG. 11 is a schematic perspective view illustrating the outer appearance of the plate-like core 20 used in the second embodiment.

FIG. 9 is a schematic perspective view illustrating the outer appearance of a coil component 2 according to a second embodiment of the present invention. FIG. 10 is a schematic perspective view illustrating a state where the plate-like core 20 is removed from the coil component 2. FIG. 11 is a schematic perspective view illustrating the outer appearance of the plate-like core 20 used in the second embodiment.

As illustrated in FIGS. 9 and 10, in the coil component 2 according to the second embodiment, two grooves $11G_1$ and $11G_2$ are formed in the flange part 11, and two grooves $12G_1$ and $12G_2$ are formed in the flange part 12. A groove $20G_1$ is formed in the surface 20B of the plate-like core 20 so as to overlap the grooves $11G_1$ and $12G_1$, and a groove $20G_2$ is formed in the surface 20B so as to overlap the grooves $11G_2$ and $12G_2$. The leading portion of the wire W1 is accommodated in the grooves $11G_1$ and $12G_1$, and the leading portion of the wire W2 is accommodated in the grooves $11G_2$ and $12G_2$. Other basic configurations are the same as those of the coil component 1 according to the first embodiment, so the same reference numerals are given to the same elements, and overlapping description will be omitted.

In the present embodiment as well, the grooves $11G_1$, $11G_2$, $12G_1$, $12G_2$, $20G_1$, and $20G_2$ extend in the x-direction. Further, the side surfaces of each of the grooves $11G_1$, $11G_2$, $12G_1$, and $12G_2$ are inclined so as to be close to each other to taper each of the grooves $11G_1$, $11G_2$, $12G_1$, and $12G_2$ in the depth direction. This facilitates accommodation of the wires W1 and W2 in the grooves $11G_1$, $11G_2$, $12G_1$, and $12G_2$ and positions the leading portions of the wires W1 and W2 in parallel to each other in the grooves $11G_1$, $11G_2$, $12G_1$, and $12G_2$.

As described above, in the present embodiment, the wires W1 and W2 are accommodated in mutually different grooves, so that the wires W1 and W2 do not contact each other in the groove. This makes it unlikely to cause twisting or tilting of the wires W1 and W2 in the groove due to variation in the winding operation of the wires W1 and W2.

Third Embodiment

Figure 12:
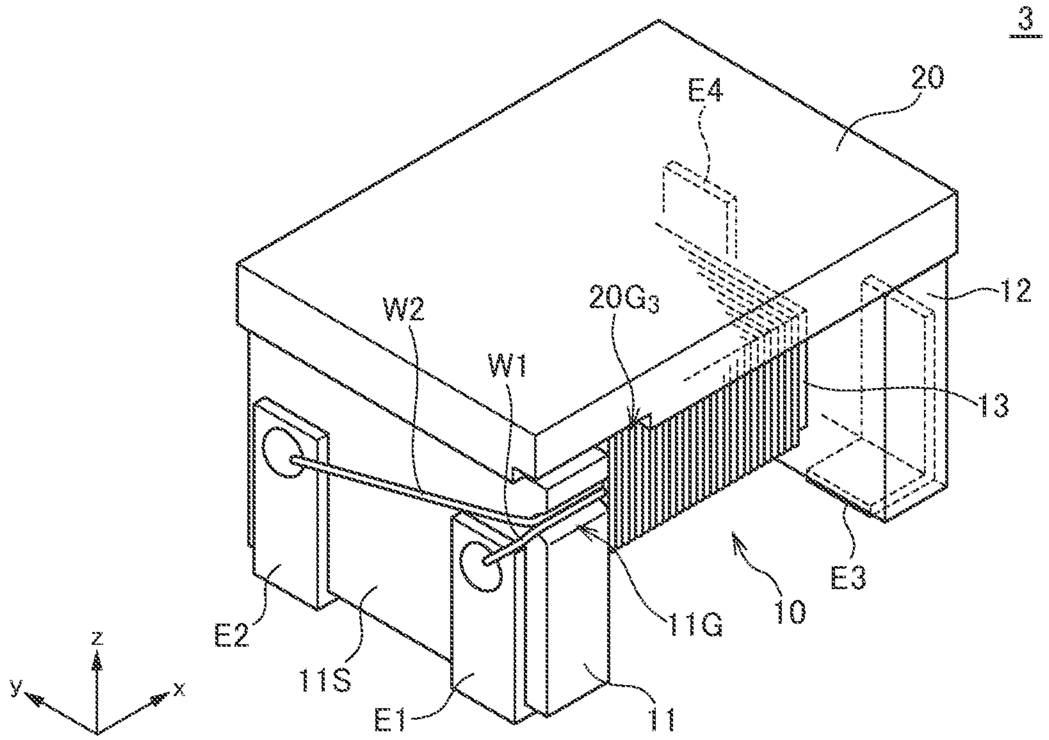
FIG. 12 is a schematic perspective view illustrating the outer appearance of a coil component 3 according to a third embodiment of the present invention.
Figure 13:
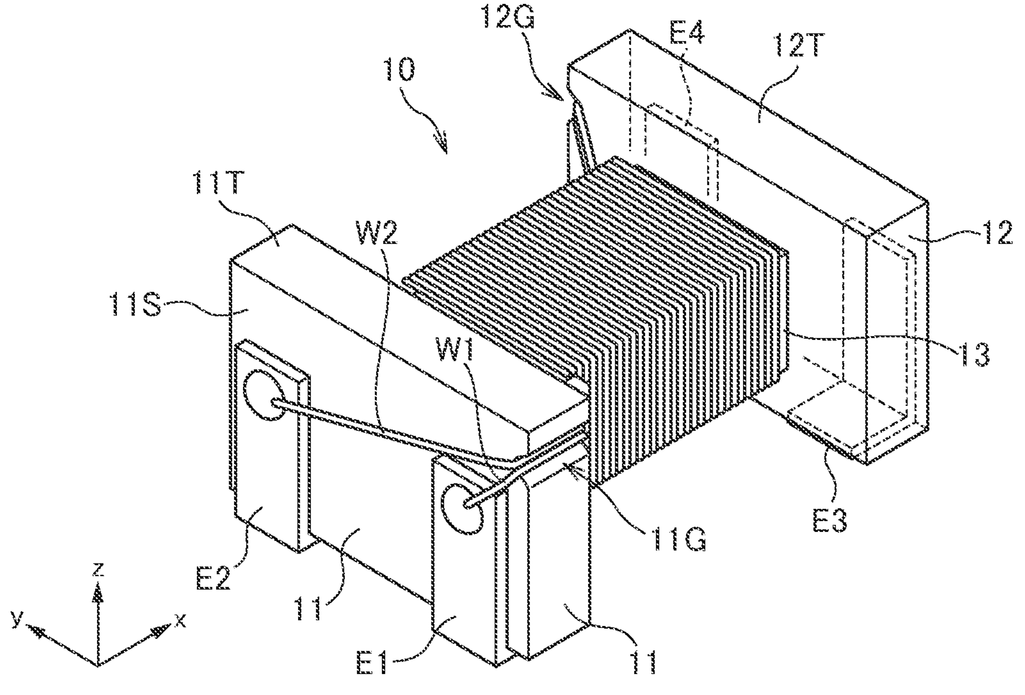
FIG. 13 is a schematic perspective view illustrating a state where the plate-like core 20 is removed from the coil component 3.

FIG. 12 is a schematic perspective view illustrating the outer appearance of a coil component 3 according to a third embodiment of the present invention. FIG. 13 is a schematic perspective view illustrating a state where the plate-like core 20 is removed from the coil component 3.

As illustrated in FIGS. 12 and 13, in the coil component 3 according to the third embodiment, the groove 11G is formed in the xz surface of the flange part 11, and the groove 12G is formed in the xz surface of the flange part 12. Thus, the grooves 11G and 12G are not closed by the plate-like core 20, and the inner walls thereof are exposed in the y-direction. In the present embodiment, the groove 20G need not be formed in the plate-like core 20. Other basic configurations are the same as those of the coil component 1 according to the first embodiment, so the same reference numerals are given to the same elements, and overlapping description will be omitted.

In the present embodiment as well, the grooves 11G and 12G extend in the x-direction. Further, the side surfaces of each of the grooves 11G and 12G are inclined so as to be close to each other to taper each of the grooves 11G and 12G. This facilitates accommodation of the wires W1 and W2 in the grooves 11G and 12G and positions the leading portions of the wires W1 and W2 in parallel to each other in the grooves 11G and 12G.

According to the present embodiment, the grooves 11G and 12G are each formed at an area having a low magnetic flux density, so that it is possible to suppress a reduction in magnetic characteristics due to the formation of the grooves 11G and 12G in the drum-shaped core 10.

It is apparent that the present invention is not limited to the above embodiments, but may be modified and changed without departing from the scope and spirit of the invention.

What is claimed is:

1. A coil component comprising:

a drum-shaped core including a first flange part, a second flange part, and a winding core part positioned between the first and second flange parts;

a plurality of first terminal electrodes provided on the first flange part;

a plurality of second terminal electrodes provided on the second flange part; and a plurality of wires wound around the winding core part, each of the plurality of wires having a first end connected to an associated one of the first terminal electrodes, and having a second end connected to an associated one of the second terminal electrodes, wherein each of the first and second flange parts has a tapered groove whose side surfaces are inclined, wherein the plurality of wires are accommodated in the tapered grooves, wherein a space factor of the plurality of wires in the tapered groove is 60% or more, wherein the plurality of wires include first and second wires, and wherein the first wire and the second wire contact each other inside the tapered groove.

2. The coil component as claimed in claim 1, further comprising a plate-like core fixed to the first and second flange parts, wherein the tapered groove is formed in a surface of each of the first and second flange parts that face the plate-like core, and wherein the plate-like core has another groove at a position overlapping the tapered groove of each of the first and second flange parts.

3. The coil component as claimed in claim 1, wherein the side surfaces of the tapered groove includes first and second side surfaces, wherein the tapered groove has a bottom surface located between the first and second side surfaces, and wherein a width of the bottom surface of the tapered groove is smaller than a sum of diameters of the first and second wires.

4. The coil component as claimed in claim 3, wherein the bottom surface of the tapered groove is flat.

5. The coil component as claimed in claim 4, wherein each of the first and second side surfaces of the tapered groove is curved.

6. A coil component comprising:

a first core including a flange part having first and second surfaces and a winding core part extending in a first direction, the first surface of the flange part having a first groove between first and second sections thereof, the second surface of the flange part being perpendicular to the first direction;

first and second terminal electrodes formed on the second surface of the flange part and arranged in a second direction perpendicular to the first direction;

a first wire wound around the winding core part and connected to the first terminal electrode via the first groove; and a second wire wound around the winding core part and connected to the second terminal electrode via the first groove, wherein the first groove has a bottom surface extending in the first and second directions and a first side surface located between the first section of the first surface and the bottom surface, wherein the first side surface is inclined with respect to the bottom surface such that an angle between the bottom surface and the first side surface is an obtuse angle, wherein a width of the bottom surface in the second direction is smaller than a sum of diameters of the first and second wires, and wherein the first wire and the second wire contact each other inside the first groove.

7. The coil component as claimed in claim 6, wherein at least one of the first and second wires contacts the first side surface.

8. The coil component as claimed in claim 7, wherein the first groove further has a second side surface located between the second section of the first surface and the bottom surface, wherein the second side surface is inclined with respect to the bottom surface such that an angle between the bottom surface and the second side surface is an obtuse angle, wherein the first wires contacts the first side surface, and wherein the second wires contacts the second side surface.

9. The coil component as claimed in claim 6, wherein a second core has a second groove overlapping the first groove, and wherein the first and second wires are pass through a through hole formed by the first and second grooves.

10. The coil component as claimed in claim 6, wherein the bottom surface of the first groove is flat.

11. The coil component as claimed in claim 10, wherein each of the first and second side surfaces of the first groove is curved.

* * * * *